J. Mattix,
Belt Fastener,
Nº 56,966. Patented Aug. 7, 1866.
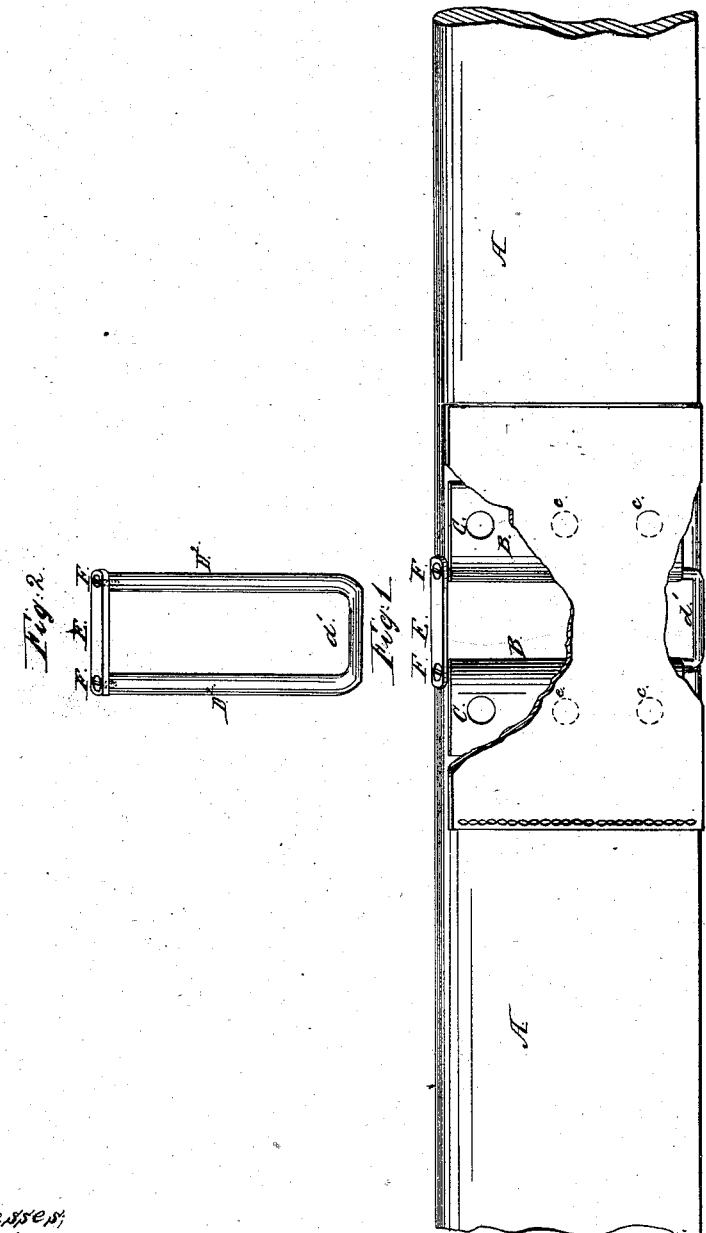

UNITED STATES PATENT OFFICE.

JAMES MATTIX, OF KOKOMO, INDIANA.

IMPROVED BELT-COUPLING.

Specification forming part of Letters Patent No. 56,966, dated August 7, 1866.

*To all whom it may concern:*

Be it known that I, JAMES MATTIX, of the city of Kokomo, in the county of Howard and State of Indiana, have invented a new and useful Improvement in Belt-Fastenings for Machine-Belts; and I do hereby declare that the following is a full, clear, and exact description of the same, reference being had to the annexed drawings, made part of this specification, in which—

Figure 1 is a view of a belt with my improved fastening applied, and Fig. 2 is a detached view of the adjustable link.

On the ends of the belt A A are attached, by rivets C C, the copper clasps B B. These may be made, however, of any suitable sheet metal bent to a U-shape and attached as described. Sufficient space is left between these clasps and the end of the belting to permit the introduction of the link $d'$. This link is formed with the three sides (omitting one end) of a parallelogram.

The ends of the parallel sides of the link are formed hollow and have threads cut inside of the tubes. The two sides of the link (marked in Fig. 2 $D^2 D^2$) are inserted through the space left, as described, in the clasps, and united by the yoke E. There are holes drilled in each end of this yoke, through which machine-screws pass, fitting the threads in the pipe-formed ends of $D^2 D^2$.

The belt may be lengthened or shortened by substituting links of suitable width.

What I claim as my invention, and seek to secure by Letters Patent, is—

The hereinabove-described device for adjusting the length of belt-couplings without removing the clasps B B, by the insertion of a three-sided link, $d'$, the ends of which are united by a yoke, E, attached by the screws F, substantially in the manner set forth.

JAMES MATTIX.

Attest:
J. H. KROH,
N. T. JACOBY.